UNITED STATES PATENT OFFICE.

CHRISTOPHER H. THOMAS, OF NEW ORLEANS, LOUISIANA.

IMPROVEMENT IN PROPHYLACTIC REMEDIES.

Specification forming part of Letters Patent No. 30,434, dated October 16, 1860.

*To all whom it may concern:*

Be it known that I, C. H. THOMAS, M. D., of New Orleans, in the parish of Orleans, in the State of Louisiana, have discovered in medicine a Prophylactic, or Preventive of Yellow Fever; and I do hereby declare that the following is a full and explicit description thereof.

The medicines that I use for the above purpose are as follows, and in the following proportions, viz: salicine, ("American Dispensatory," fifth edition, 1859, p. 819,) half an ounce; elixir vitriol, three f. drams; old Bourbon whisky, (strength unimportant—merely a stimulant vehicle,) ten ounces; tincture of gelseminum, (Dispensatory, as above, p. 1306,) one ounce. The whole to be mixed and bottled for use.

Directions: One table-spoonful at a time, once a day, at night on retiring, during the prevalence of yellow fever. If much exposed to the cause, however, take the same quantity twice a day, morning and night. Regulate the quantity for children according to age, habits, &c.

And what I claim as my discovery, and desire to secure Letters Patent for, is—

The above composition of matter or compound of medicines as a preventive of yellow fever.

CHRISTOPHER H. THOMAS.

Witnesses:
   H. J. THOMAS,
   C. A. DEISLER.